(12) United States Patent
Muchherla et al.

(10) Patent No.: US 12,079,517 B2
(45) Date of Patent: Sep. 3, 2024

(54) BUFFER ALLOCATION FOR REDUCING BLOCK TRANSIT PENALTY

(71) Applicant: Micron Technology, Inc., Boise, ID (US)

(72) Inventors: Kishore Kumar Muchherla, Fremont, CA (US); Peter Feeley, Boise, ID (US); Jiangli Zhu, San Jose, CA (US); Fangfang Zhu, San Jose, CA (US); Akira Goda, Tokyo (JP); Lakshmi Kalpana Vakati, San Jose, CA (US); Vivek Shivhare, Milpitas, CA (US); Dave Scott Ebsen, Minnetonka, MN (US); Sanjay Subbarao, Irvine, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 12 days.

(21) Appl. No.: 17/870,139

(22) Filed: Jul. 21, 2022

(65) Prior Publication Data

US 2024/0028259 A1 Jan. 25, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;
(Continued)

(56) References Cited

U.S. PATENT DOCUMENTS

| 4,835,686 A | * | 5/1989 | Furuya | G06F 12/0866 711/E12.075 |
| 5,202,972 A | * | 4/1993 | Gusefski | G06F 12/084 711/123 |

(Continued)

OTHER PUBLICATIONS

P. Behnam and M. N. Bojnordi, "STFL: Energy-Efficient Data Movement with Slow Transition Fast Level Signaling," 2019 56th ACM/IEEE Design Automation Conference (DAC), Las Vegas, NV, USA, 2019, pp. 1-6. (Year: 2019).*

*Primary Examiner* — Daniel C. Chappell
(74) *Attorney, Agent, or Firm* — NICHOLSON DE VOS WEBSTER & ELLIOTT LLP

(57) ABSTRACT

Methods, systems, and apparatuses include receiving a write command including user data. The write command is directed to a portion of memory including a first block and a second block. A buffer is allocated for executing the write command to the first block. The buffer includes multiple buffer decks and the buffer holds the user data written to the first block. User data is programmed into the first block to a threshold percentage. The threshold percentage is less than one hundred percent of the first block. A buffer deck is invalidated in response to programming the first block to the threshold percentage. The buffer deck is reallocated to the second block for programming the user data into the second block. The buffer deck holds user data written to the second block.

20 Claims, 6 Drawing Sheets

(58) Field of Classification Search
CPC ....... G06F 16/00–986; G06F 18/00–41; G06F 17/00–40; G06F 21/00–88; G06F 2003/0697; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 5,774,431 | A * | 6/1998 | Bos | G11B 27/11 369/30.28 |
| 6,351,791 | B1 * | 2/2002 | Freerksen | G06F 12/0831 711/146 |
| 6,725,341 | B1 * | 4/2004 | Peir | G06F 12/0831 711/143 |
| 7,089,372 | B2 * | 8/2006 | DeSota | G06F 12/0817 711/E12.027 |
| 7,856,532 | B2 * | 12/2010 | Lataille | G06F 12/0859 711/128 |
| 8,073,922 | B2 * | 12/2011 | Bates | G06F 3/065 709/224 |
| 8,171,140 | B2 * | 5/2012 | Waldspurger | G06F 3/0631 709/226 |
| 8,356,126 | B2 * | 1/2013 | Ashmore | G06F 3/0659 710/56 |
| 8,446,787 | B2 * | 5/2013 | Sarin | G11C 29/848 365/185.09 |
| 10,013,214 | B2 * | 7/2018 | Chiu | G06F 3/0655 |
| 11,768,632 | B2 * | 9/2023 | Kanno | G06F 3/0679 711/154 |
| 2004/0193760 | A1 * | 9/2004 | Matsunami | G06F 3/0649 710/36 |
| 2007/0070829 | A1 * | 3/2007 | Sato | G11B 19/04 |
| 2007/0156954 | A1 * | 7/2007 | Trika | G06F 11/1471 711/E12.04 |
| 2008/0253013 | A1 * | 10/2008 | Mizuno | G06F 3/061 360/71 |
| 2011/0072207 | A1 * | 3/2011 | Jin | G06F 16/2358 711/E12.001 |
| 2012/0311230 | A1 * | 12/2012 | Larson | G06F 3/0679 711/E12.008 |
| 2014/0133220 | A1 * | 5/2014 | Danilak | G11C 11/5628 365/158 |
| 2014/0258588 | A1 * | 9/2014 | Tomlin | G06F 3/0607 711/103 |
| 2015/0349806 | A1 * | 12/2015 | Totolos, Jr. | G06F 11/073 714/704 |
| 2017/0199817 | A1 * | 7/2017 | Ishihara | G06F 12/0868 |
| 2019/0295610 | A1 * | 9/2019 | Fantini | G11C 13/0033 |
| 2023/0325115 | A1 * | 10/2023 | Taylor | G06F 3/0611 711/164 |

\* cited by examiner

BUFFER ALLOCATION FOR REDUCING BLOCK TRANSIT PENALTY

TECHNICAL FIELD

The present disclosure generally relates to buffer allocation, and more specifically, relates to buffer allocation for reducing block transit penalty.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
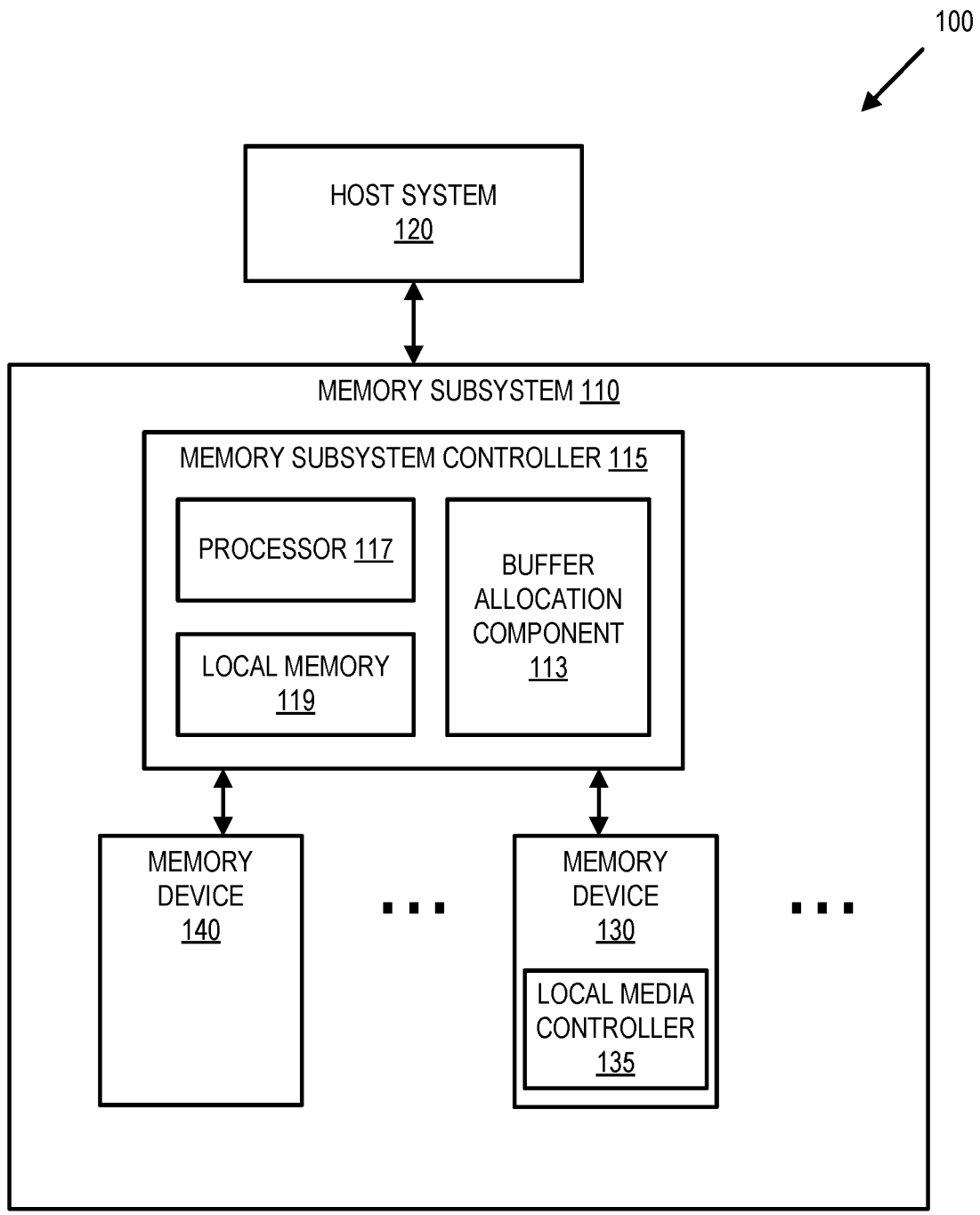
FIG. 1 illustrates an example computing system that includes a memory subsystem in accordance with some embodiments of the present disclosure.

Aspects of the present disclosure are directed to buffer allocation for reducing block transit penalty in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

In conventional memory systems, defects introduced during manufacturing and during operation may prevent a memory block from being properly programmed. When attempting to program a memory block containing defects, user data being written to the memory block is lost when the programming fails. To prevent data loss due to defects, the user data being programmed into the memory block is held in a buffer while being programmed. Additionally, when programming successive memory blocks, an additional buffer is used to store the beginning of the successive block when the current block is not yet finished. For example, data programmed to a QLC block can be buffered in four SLC blocks. When accounting for programming successive blocks, a buffer of at least five SLC blocks can be used when programming multiple QLC blocks (four SLC blocks to cover the current QLC block and one SLC block for beginning of the successive QLC block) to ensure no data loss due to defects. If there is not full coverage of the memory block to be programmed, a defect in the memory block could cause a programming failure and an increase in uncorrectable bit error rate (UBER). For a QLC block that does not include defects, however, a buffer of four SLC blocks is excessive. There is, therefore, a tradeoff between UBER and overprovisioning to provide full buffer coverage of successive memory blocks.

Aspects of the present disclosure address the above and other deficiencies by using buffer allocation to allocate a portion of the buffer to the successive block when the programming of the current block has satisfied a threshold percentage. This removes the need for a transitory buffer while programming successive memory blocks, reducing overprovisioning. Because the portion of the buffer allocated to the successive block is chosen based on the threshold percentage, the reallocated portion of the buffer is already fully programmed. As a result, there is no increase in UBER that would typically accompany a smaller buffer size. In other words, this buffer allocation scheme minimizes the buffer space and the corresponding overprovisioning penalty while still providing adequate defectivity coverage when programming successive memory blocks.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO- DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a buffer allocation component 113 that can allocate a buffer to reduce a block transit penalty. In some embodiments, the controller 115 includes at least a portion of the buffer allocation component 113. For example, the controller 115 can include a processor 117 (processing device) configured to execute instructions stored in local memory 119 for performing the operations described herein. In some embodiments, a buffer allocation component 113 is part of the host system 120, an application, or an operating system.

The buffer allocation component 113 can allocate a portion of a buffer to a subsequent block when a current block is programmed to a threshold percentage. Further details with regards to the operations of the buffer allocation component 113 are described below.

Figure 2:
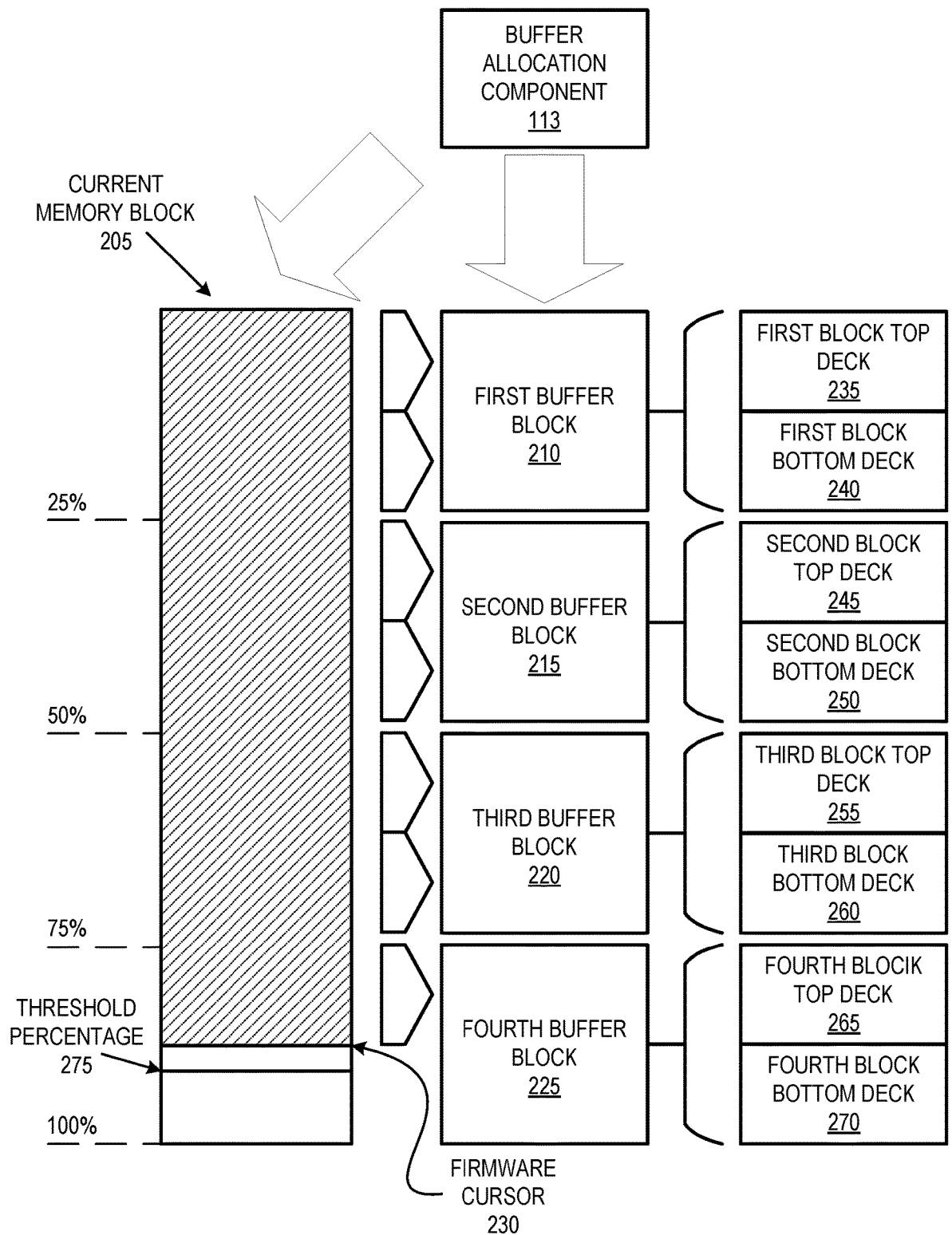
FIG. 2 illustrates a block diagram of an example system that includes a buffer allocation component.

FIG. 2 illustrates a block diagram of an example system that includes a buffer allocation component 113. Buffer allocation component 113 programs current memory block 205 with user data while concurrently storing the user data in the buffer including first, second, third, and fourth buffer blocks 210, 215, 220, and 225. Each of first, second, third, and fourth buffer blocks 210, 215, 220, and 225 includes a top and a bottom deck such that first buffer block 210 includes first block top deck and bottom deck 235 and 240, second buffer block 215 includes second block top deck and bottom deck 245 and 250, third buffer block 220 includes third block top deck and bottom deck 255 and 260, and fourth buffer block 225 includes fourth block top deck and bottom deck 265 and 270.

In some embodiments, although only two decks, top and bottom, are illustrated for each buffer block, each of the buffer blocks 210, 215, 220, and 225 can be divided into more than two decks. For the purposes of this disclosure, the term deck refers to a subdivision of a memory block that can be independently programmed or erased. Therefore, for a block of a given size, the higher the number of decks in a buffer block, the smaller the size of the decks. In some embodiments, a deck may not be the smallest subdivision of a memory block and the deck may also contain subdivisions within itself. It is noted that each of first block top deck and bottom deck 235 and 240, second block top deck and bottom deck 245 and 250, third block top deck and bottom deck 255 and 260, and fourth block top deck and bottom deck 265 and 270 are subdivisions of their respective buffer blocks 210, 215, 220, and 225 and are illustrated for clarity.

In some embodiments, first, second, third, and fourth buffer blocks 210, 215, 220, and 225 are part of a local memory of a memory subsystem, such as local memory 119 of FIG. 1. In other embodiments, first, second, third, and fourth buffer blocks 210, 215, 220, and 225 are part of buffer allocation component 113. Likewise, in some embodiments, current memory block 205 is part of a memory device, such as memory device 140 or 130 of FIG. 1.

In some embodiments, current memory block 205 is composed of QLCs. In such embodiments, each of the buffer blocks, 210, 215, 220, and 225 holds an amount of data equivalent to a quarter of a QLC block (e.g., an SLC block). Each of first block top deck and bottom deck 235 and 240, second block top deck and bottom deck 245 and 250, third block top deck and bottom deck 255 and 260, and fourth block top deck and bottom deck 265 and 270 therefore hold an amount of data equivalent to an eighth of a QLC block or half of an SLC block.

In other embodiments, current memory block 205 is composed of another cell type, such as MLCs or TLCs, that lacks a data protection mechanism such as a redundant array of independent NAND (RAIN). In such embodiments, the number of buffer blocks varies based on the cell type. For example, when current memory block 205 is composed of a TLC, three SLC blocks, 210, 215, and 220 can provide sufficient buffer space. Likewise, when current memory block 205 is composed of an MLC, two SLC buffer blocks 210 and 215 will suffice. In these embodiments, each of the decks of the buffer blocks holds an amount of data equivalent to the corresponding portion of the overall MLC or TLC block. For example, the memory block is composed of TLCs and each buffer block is a third of current memory block 205, holding an equivalent amount of data of an SLC. Each of the decks of the buffer blocks therefore holds data equivalent to a sixth of the TLC block (e.g., the amount of data held in half of an SLC block). In an alternative example, the memory block is composed of MLCs and each buffer block is half of current memory block 205 holding the equivalent amount of data of an SLC. Each of the decks therefore holds data equivalent to a quarter of the MLC block (e.g., the amount of data held in half of an SLC block).

First, second, third, and fourth buffer blocks, 210, 215, 220, and 225 are used as a defectivity backup in the case of programming failure of current memory block 205. First, second, third, and fourth buffer blocks, 210, 215, 220, and 225, therefore, are a cell/memory type with high reliability and low potential for errors. In some embodiments, first, second, third, and fourth buffer blocks, 210, 215, 220, and 225 are SLC blocks and therefore do not require multiple pass programming.

In some embodiments, buffer allocation component 113 programs current memory block 205 in multiple passes. For example, buffer allocation component 113 may program current memory block 205 in two passes, the first pass referred to as a coarse programming pass and the second pass referred to as a fine programming pass. The coarse programming pass does not contain all the information required to read the user data and the user data therefore is stored elsewhere until the fine programming pass is completed. In contrast, after buffer allocation component 113 conducts a fine programming pass of the user data in current memory block 205, there is sufficient information to read the user data.

In embodiments where buffer allocation component 113 uses multiple pass programming to program current memory block 205, first, second, third, and fourth buffer blocks 210, 215, 220, and 225 serve the dual functions of (1) protecting against programming block failure of current memory block 205 and (2) providing a readable copy of the user data during the coarse programming pass. For example, current memory block 205 is programmed in multiple passes but first, second, third, and fourth buffer blocks 210, 215, 220, and 225 are not. Therefore, buffer allocation component 113 programs a portion of the user data into current memory block 205 with a coarse programming pass while storing the portion of the user data in first buffer block 210. First buffer block 210 therefore contains a fully programmed version of the portion of the user data to use for the fine programming of current memory block 205.

Firmware cursor 230 is a cursor indicating the progress of buffer allocation component 113 programming current memory block 205. In some embodiments, firmware cursor 230 indicates the progress of buffer allocation component 113 conducting a coarse programming pass. In such embodiments, the progress indicated in FIG. 2, by firmware cursor 230 and the shaded portion of current memory block 205 indicates the progress of a coarse programming pass on current memory block 205.

The location of firmware cursor 230 indicates that buffer allocation component 113 has not completed the coarse programming pass for all of current memory block 205. Buffer allocation component 113 therefore has also not completed programming the data also stored in fourth buffer block 225. Furthermore, because firmware cursor 230 has not reached threshold percentage 275, buffer allocation component 113 has not yet allocated any portion of first, second, third, and fourth buffer block 210, 215, 220, and 225 to the next memory block to be programmed.

Buffer allocation component 113 programs user data into current memory block 205 and stores the user data in first buffer block 210, second buffer block 215, third buffer block 220, and fourth buffer block 225. In some embodiments, buffer allocation component 113 stores the user data in the buffer blocks 210, 215, 220, and 225 and subsequently programs the user data into current memory block 205. In other embodiments, buffer allocation component 113 concurrently programs the user data into current memory block 205 while storing the user data in the buffer blocks 210, 215, 220, and 225.

Each of first, second, third, and fourth buffer blocks 210, 215, 220, and 225 store user data for the corresponding portions of current memory block 205. For example, first buffer block 210 stores user data for the first quarter (0-25%) of current memory block 205, second buffer block 215 stores user data for the second quarter (25-50%) of current memory block 205, third buffer block 220 stores user data for the third quarter (50-75%) of current memory block 205, and fourth buffer block 225 stores user data for the fourth quarter (75-100%) of current memory block 205.

Although threshold percentage 275 is shown at a certain point in current memory block 205, this illustration is for representative purposes and different threshold percentages may be used for current memory block 205 depending on a number of variables including the time for a controller (such as memory subsystem controller 115) to execute operations, the time required to queue future pages in memory, the speed of controller/controller firmware, the efficiency of the controller/controller firmware, the size of independently erasable/programmable decks, and similar metrics. For example, threshold percentage 275 may be selected such that it is the highest percentage possible without causing latency issues in firmware when switching from current memory block 205 to a subsequent memory block.

In some embodiments, rather than storing user data, first, second third, and fourth buffer blocks 210, 215, 220, and 225 store related data for protecting the user data stored in current memory block 205 against defectivity. For example, first, second third, and fourth buffer blocks 210, 215, 220, and 225 may store parity data associated with the user data stored in current memory block 205.

Figure 3:
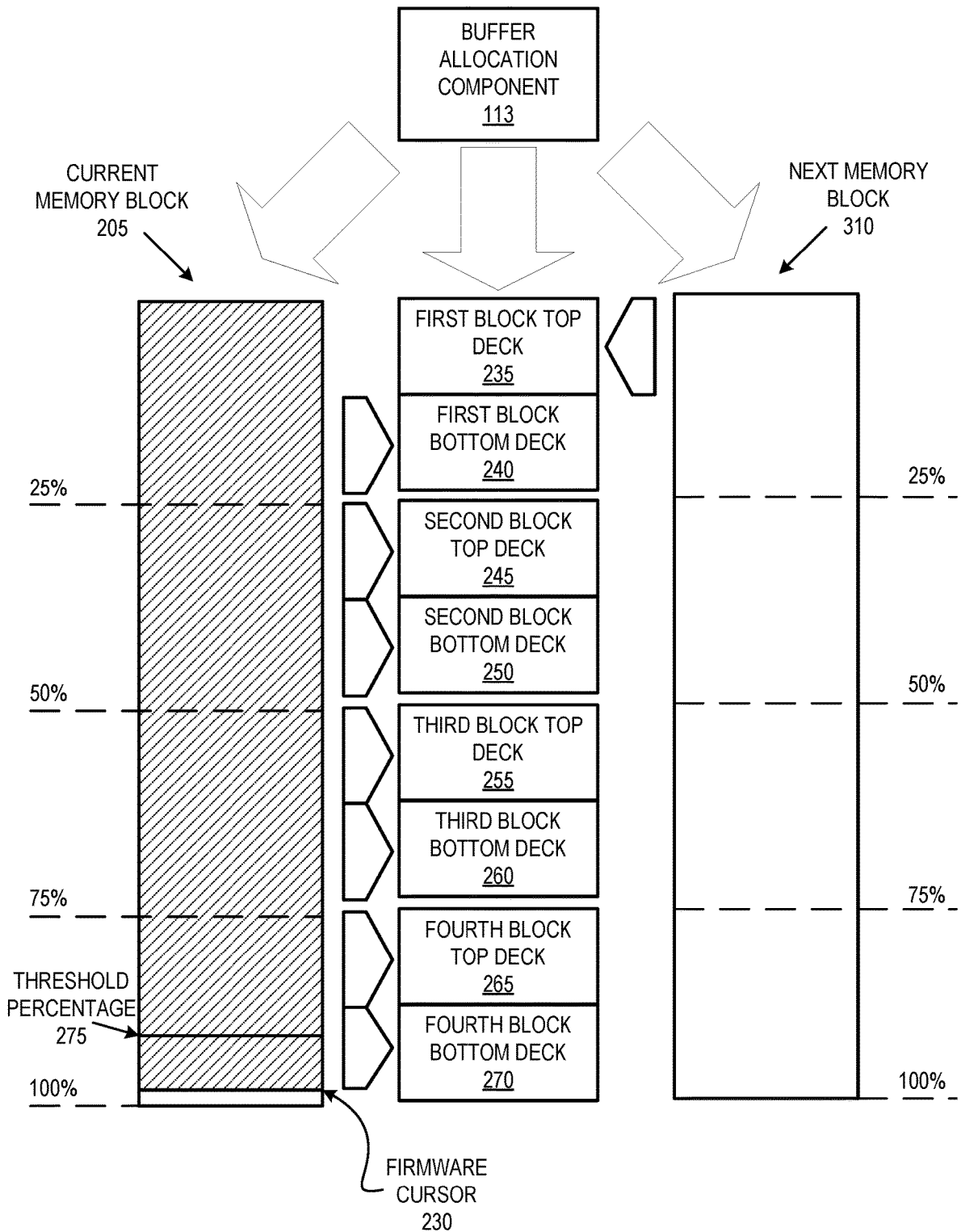
FIG. 3 illustrates another block diagram of an example system that includes a buffer allocation component.

FIG. 3 illustrates a block diagram of an example system that includes a buffer allocation component 113. As shown in FIG. 3, buffer allocation component 113 programs current memory block 205 and next memory block 310 with user data. Buffer allocation component 113 buffers the data in first block top and bottom deck 235 and 240, second block top and bottom deck 245 and 250, third block top and bottom deck 255 and 260, and fourth block top and bottom deck 265 and 270. In some embodiments, current memory block 205 and next memory block 310 are parts of a memory device, such as memory device 140 or 130 of FIG. 1.

In response to buffer allocation component 113 reaching threshold percentage 275, as indicated by the progress of firmware cursor 230, buffer allocation component 113 will allocate a portion of buffer blocks 210, 215, 220, and 225 to next memory block 310 to be programmed subsequent to current memory block 205.

In some embodiments, threshold percentage 275 is set to ensure that buffer allocation component 113 completed a fine programming pass of the portion of current memory block 205 protected by the portion of buffer blocks 210, 215, 220, and 225 allocated to next memory block 310. For example, by the time buffer allocation component 113 has reached threshold percentage 275, buffer allocation component 113 will have completed the fine programming pass of at least the portion of current memory block 205 protected by first block top deck 235. When using multiple pass programming, for any given deck, the fine programming pass of that deck may begin before the completion of the coarse programming pass for the same deck. Similarly, the fine programming pass of one deck may be ongoing during the coarse programming pass of a subsequent deck.

Although first block top deck 235 is shown as allocated to next memory block 310, different portions of the buffer may be allocated to next memory block 310 depending on a number of variables including the time required for the controller (such as memory subsystem controller 115 of FIG. 1) to execute operations, the time required to queue future pages in memory, the speed of the controller/controller firmware, the efficiency of the controller/controller firmware, the size of independently erasable/programmable decks, and similar metrics. For example, portions smaller than first block top deck 235 can be allocated to next memory block 310 if the portions are independently programmable and of size such that no further portions will be needed until current memory block 205 is verified and the rest of the buffer portions are freed up for allocation to next memory block 310.

In some embodiments, in response to buffer allocation component 113 satisfying threshold percentage 275 while programming current memory block 205, buffer allocation component 113 invalidates the data in first block top deck 235 so that the data can be overwritten. In other embodiments, buffer allocation component 113 clears the current block data in first block top deck 235.

Once firmware cursor 230 has passed threshold percentage 275, there is a possibility of a programming block failure causing the entirety of current memory block 205 to become unreadable. Even if there is a defect that causes a programming failure after firmware cursor 230 passes threshold percentage 275, a portion of the user data intended for current memory block 205 will remain buffered, e.g., in first block bottom deck 240, second block top and bottom deck 245 and 250, third block top and bottom deck 255 and 260, and fourth block top and bottom deck 265 and 270. The portion of data in current memory block 205 that was buffered by first block top deck 235 before firmware cursor 230 reached threshold percentage 275, however, can be lost. The other seven eighths of the buffered user data, however, will still be recoverable from the buffer reducing the likelihood of an increase to UBER or at least maintaining UBER within an acceptable limit.

In some embodiments, once buffer allocation component 113 finishes programming current memory block 205, buffer allocation component 113 scans current memory block 205 to verify correct programming. Once buffer allocation component 113 has programmed and verified current memory block 205, buffer allocation component 113 allocates the rest of the buffer (i.e., first block bottom deck 240, second block top and bottom deck 245 and 250, third block top and bottom deck 255 and 260, and fourth block top and bottom deck 265 and 270) to next memory block 310.

In some embodiments, in response to buffer allocation component 113 allocating first block bottom deck 240, second block top and bottom deck 245 and 250, third block top and bottom deck 255 and 260, and fourth block top and bottom deck 265 and 270 to next memory block 310, buffer allocation component 113 clears the data in first block bottom deck 240, second block top and bottom deck 245 and 250, third block top and bottom deck 255 and 260, and fourth block top and bottom deck 265 and 270. In other embodiments, buffer allocation component 113 invalidates the data in first block bottom deck 240, second block top and bottom deck 245 and 250, third block top and bottom deck 255 and 260, and fourth block top and bottom deck 265 and 270 so that the data can be overwritten.

Figure 4:
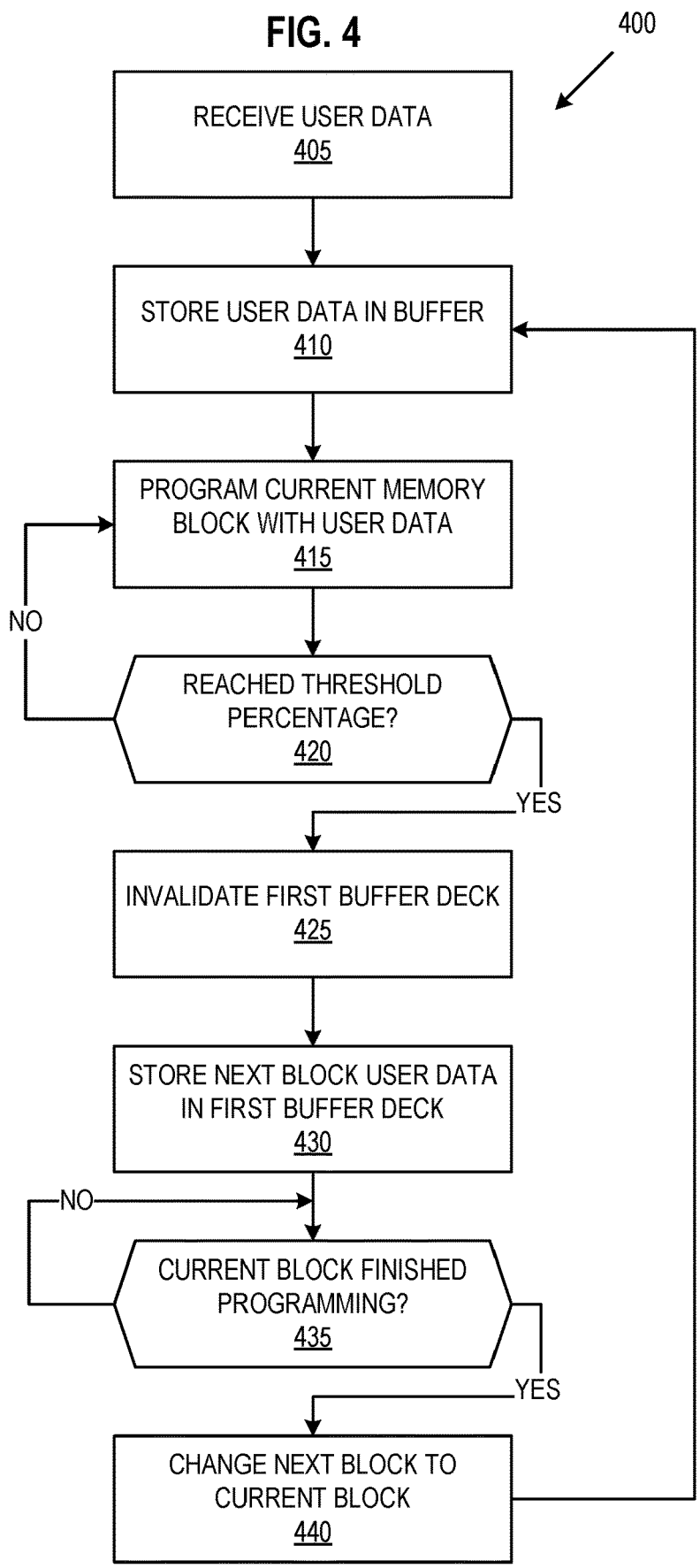
FIG. 4 is a flow diagram of an example method to allocate a buffer to reduce a block transit penalty in accordance with some embodiments of the present disclosure.

FIG. 4 is a flow diagram of an example method 400 to allocate a buffer to reduce a block transit penalty, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the buffer allocation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives user data. For example, the processing device may receive a write command from a host system, such as host system 120. The write command may include user data and a logical address. The processing device may translate the logical address into a physical address to determine a location to program the user data. For example, the processing device may translate the logical address into a physical address directed to a memory block, such as current memory block 205.

At operation 410, the processing device stores user data in a buffer. For example, the processing device programs the user data received at operation 405 into a buffer associated with a memory block, such as current memory block 205. The buffer is made up of blocks, each of which includes decks which can be programmed/erased independently. In some embodiments, the memory blocks are also made up of decks which can be programmed/erased independently.

At operation 415, the processing device programs the current memory block. For example, the processing device programs the user data received at operation 405 into the memory block.

At operation 420, the processing device determines whether programming of the current memory block has satisfied a threshold percentage. For example, the processing device determines whether the memory block has been programmed to or past the threshold percentage. If the processing device determines the programming has satisfied a threshold percentage, the method 400 proceeds to operation 425. Otherwise, the method 400 returns to operation 415. In other words, the processing device continues programming the current memory block with the user data until the processing devices reaches the threshold percentage.

At operation 425, the processing device invalidates the first buffer deck or otherwise frees the first deck for use as a buffer for a subsequent memory block. For example, the processing device may invalidate the data stored in the first buffer deck thereby allowing the content of the first buffer deck to be overwritten with data for the subsequent memory block. In some embodiments, the processing device deletes the data stored in the first buffer deck instead of or in addition to invalidating the data. In some embodiments, the first deck of the buffer is a deck or similar subdivision of a block that is the smallest subdivision capable of independent programming/erasing.

At operation 430, the processing device stores next block user data in the first buffer deck. For example, the processing device begins preparing to program user data for the next block by allocating the first buffer deck to the next block and loading a portion of the user data for the next block into the first buffer deck.

At operation 435, the processing device determines whether the current block has finished programming. For example, because the threshold percentage is less than one hundred percent, the current memory block is still being programmed. When the current block has finished programming, the processing device proceeds to operation 440. Otherwise, the method 400 returns to operation 435.

At operation 440, the processing device changes the next block to the current block. In some embodiments, in response to determining that the current memory block has finished programming, the processing device scans the current memory block to verify the success of the programming operation. In response to the processing device determining that there are no failures in the programming operation (e.g., due to a defect in the current memory block), the processing device invalidates the user data stored in the remaining decks of the buffer and allocates the remaining decks of the buffer to the next memory block. In response to the processing device determining that there are defects in the current memory block, the processing device uses the data stored in the buffer to correct the defects in the current memory block before invalidating the data stored in the remaining decks of the buffer and allocating the remaining decks of the buffer to the next memory block.

Figure 5:
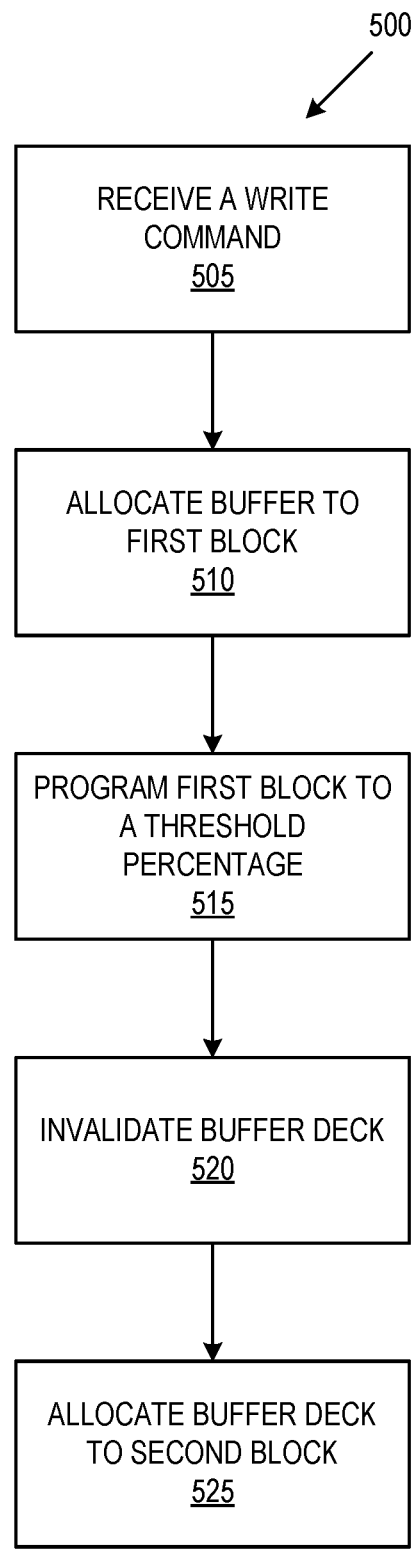
FIG. 5 is a flow diagram of another example method to allocate a buffer to reduce a block transit penalty in accordance with some embodiments of the present disclosure.

FIG. 5 is a flow diagram of an example method 500 to allocate a buffer to reduce a block transit penalty, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the buffer allocation component 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device receives a write command. For example, the processing device may receive a write command from a host system, such as host system 120. The write command may include user data and a logical address. The processing device may translate the logical address into a physical address to determine a location to program the user data. For example, the processing device may translate the logical address into a physical address directed to a memory block, such as current memory block 205.

At operation 510, the processing device allocates a buffer to the first block. For example, the processing device allocates multiple memory blocks, such as multiple memory blocks from local memory 119, for use as a buffer while programming user data into a memory block, such as current memory block 205. In some embodiments, in response to the processing device allocating the buffer to the first block, the processing device begins programming user data into the buffer.

At operation 515, the processing device programs the first block to a threshold percentage. For example, the processing device programs the user data received at operation 505 into the buffer allocated in operation 510. The processing device also programs the user data received at operation 405 into the memory block, such as current memory block 205. In some embodiments, the processing device concurrently programs the user data in the buffer allocated at operation 510 and the current block. As the processing device programs the first memory block, the processing device determines when the programming of the first block has satisfied the threshold percentage.

At operation 520, the processing device invalidates the first buffer deck or otherwise frees the first deck for use as a buffer for a subsequent memory block. For example, in response to determining the programming of the first block has satisfied the threshold percentage, the processing device may invalidate the data stored in the first buffer deck thereby allowing the content of the first buffer deck to be overwritten with data for the subsequent memory block. In some embodiments, the processing device deletes the data stored in the first buffer deck instead of or in addition to invalidating the data. In some embodiments, the first deck of the buffer is a deck or similar subdivision of a block that is the smallest subdivision capable of independent programming/erasing.

At operation 525, the processing device allocates the invalidated buffer deck to the second block. For example, the processing device begins preparing to program user data for the next block by allocating the first buffer deck to the next block and loading a portion of the user data for the next block into the first buffer deck. In some embodiments, the first deck of the buffer is a deck or similar subdivision of a block that is the smallest subdivision capable of independent programming/erasing.

Figure 6:
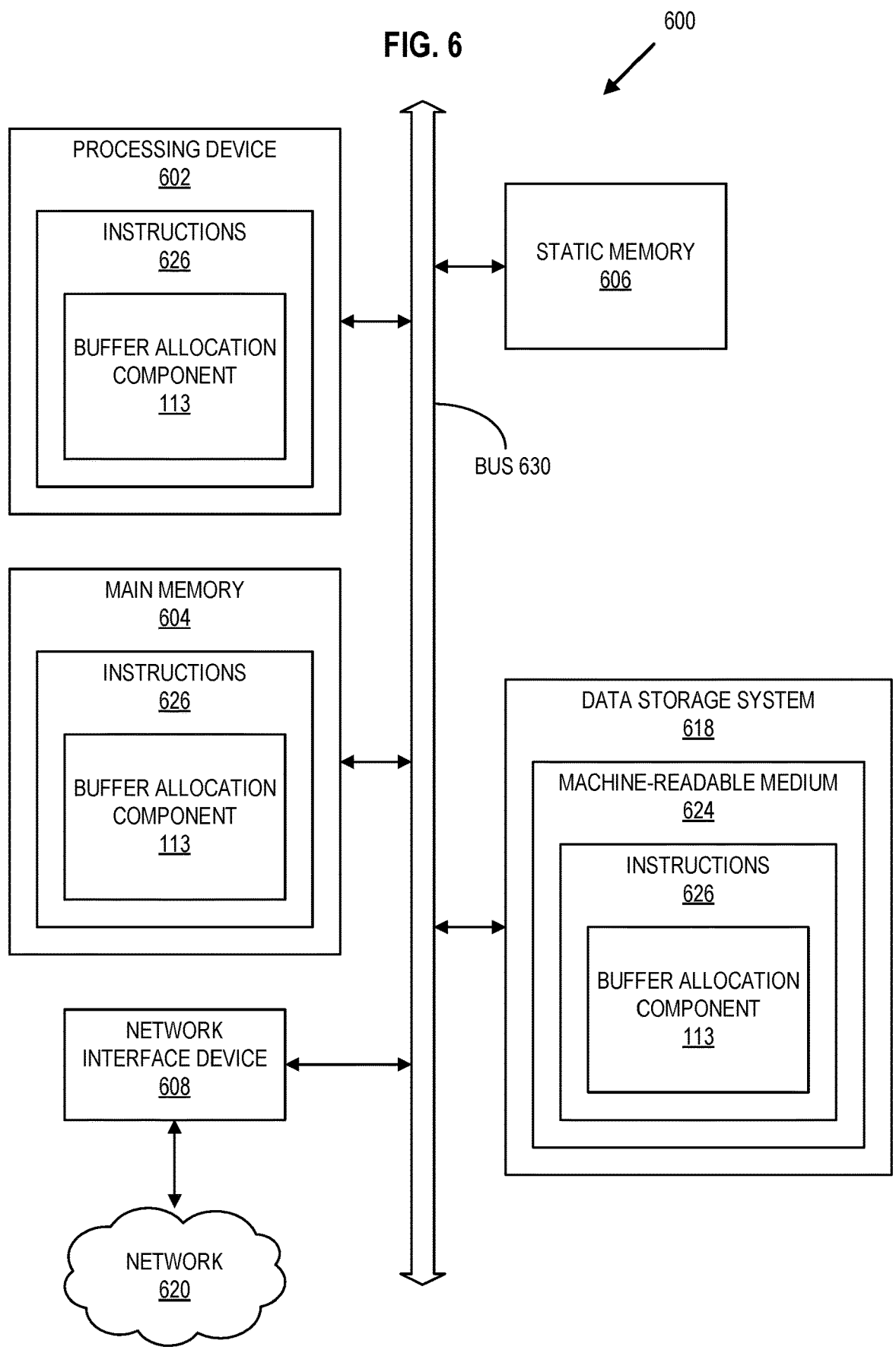
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the buffer allocation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to a buffer allocation component (e.g., the buffer allocation component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 400 and 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving a write command including user data, wherein the write command is directed to a portion of memory including a first block and a second block;
   allocating a buffer for executing the write command to write the user data to the first block, the buffer comprising a plurality of buffer decks;
   writing a first portion of the user data to a first buffer deck of the plurality of buffer decks;
   programming the user data into the first block to a threshold percentage, wherein the threshold percentage is less than one hundred percent of the first block;
   invalidating the first buffer deck in response to programming the first block to the threshold percentage;
   reallocating the first buffer deck to the second block for writing the user data to the second block; and
   writing a second portion of the user data to the first buffer deck.

2. The method of claim 1, wherein the threshold percentage is based on controller speed and controller efficiency.

3. The method of claim 1, wherein the first block and the second block are a first type of non-volatile memory element and the buffer is a second type of non-volatile memory element.

4. The method of claim 3, wherein the second type of non-volatile memory element is programmable in a single pass.

5. The method of claim 4, wherein the first type of non-volatile memory element is a quad-level cell.

6. The method of claim 1, wherein the first portion of user data is programmed before other portions of the user data are programmed into the first block.

7. The method of claim 1, wherein the buffer simultaneously holds user data written to the first block and the second block.

8. A non-transitory computer-readable storage medium comprising instructions that, when executed by a processing device, cause the processing device to:
- receive a write command including user data, wherein the write command is directed to a portion of memory including a first block and a second block;
- allocate a buffer for executing the write command to write the user data to the first block, the buffer comprising a plurality of buffer decks;
- write a first portion of the user data to a first buffer deck of the plurality of buffer decks;
- program the user data into the first block to a threshold percentage, wherein the threshold percentage is less than one hundred percent of the first block; and
- invalidate the first buffer deck in response to programming the first block to the threshold percentage;
- reallocate the first buffer deck to the second block for writing the user data to the second block; and
- write a second portion of the user data to the first buffer deck.

9. The non-transitory computer-readable storage medium of claim 8, wherein the threshold percentage is determined based on controller speed and controller efficiency.

10. The non-transitory computer-readable storage medium of claim 8, wherein the first block and the second block are a first type of non-volatile memory element and the buffer is a second type of non-volatile memory element.

11. The non-transitory computer-readable storage medium of claim 10, wherein the second type of non-volatile memory element is programmable in a single pass.

12. The non-transitory computer-readable storage medium of claim 11, wherein the first type of non-volatile memory element is a quad-level cell.

13. The non-transitory computer-readable storage medium of claim 8, wherein the first portion of user data is programmed before other portions of the user data are programmed into the first block.

14. The non-transitory computer-readable storage medium of claim 8, wherein the buffer simultaneously holds user data written to the first block and the second block.

15. A system comprising:
- a plurality of memory devices; and
- a processing device, operatively coupled with the plurality of memory devices, to:
  - receive a write command including user data, wherein the write command is directed to a portion of memory including a first block and a second block;
  - allocate a buffer for executing the write command to write the user data to the first block, the buffer comprising a plurality of buffer decks and wherein the first block and the second block are a first type of non-volatile memory element and the buffer is a second type of non-volatile memory element;
  - write a first portion of the user data to a first buffer deck of the plurality of buffer decks;
  - program the user data into the first block to a threshold percentage, wherein the threshold percentage is less than one hundred percent of the first block;
  - invalidate the first buffer deck in response to programming the first block to the threshold percentage;
  - reallocate the first buffer deck to the second block for writing the user data to the second block; and
  - write a second portion of the user data to the first buffer deck.

16. The system of claim 15, wherein the threshold percentage is determined based on controller speed and controller efficiency.

17. The system of claim 15, wherein the second type of non-volatile memory element is programmable in a single pass.

18. The system of claim 17, wherein the first type of non-volatile memory element is a quad-level cell.

19. The system of claim 15, wherein the first portion of user data is programmed before other portions of the user data are programmed into the first block.

20. The system of claim 15, wherein the buffer simultaneously holds user data written to the first block and the second block.

* * * * *